US009136656B2

(12) United States Patent
Reed et al.

(10) Patent No.: US 9,136,656 B2
(45) Date of Patent: *Sep. 15, 2015

(54) ETHERNET OVER COAXIAL COUPLING SYSTEM, METHOD AND APPARATUS

(71) Applicant: AT&T Intellectual Property I, LP, Atlanta, GA (US)

(72) Inventors: Vernon Reed, Austin, TX (US); Ahmad Ansari, Cedar Park, TX (US); David Rackley, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/856,525

(22) Filed: Apr. 4, 2013

(65) Prior Publication Data

US 2013/0224994 A1 Aug. 29, 2013

Related U.S. Application Data

(63) Continuation of application No. 12/326,666, filed on Dec. 2, 2008, now Pat. No. 8,443,406.

(51) Int. Cl.
| | |
|---|---|
| H04N 7/18 | (2006.01) |
| H01R 24/54 | (2011.01) |
| H04L 12/28 | (2006.01) |
| H04N 7/10 | (2006.01) |

(52) U.S. Cl.
CPC .......... *H01R 24/547* (2013.01); *H04L 12/2838* (2013.01); *H04L 12/2861* (2013.01); *H04N 7/104* (2013.01); *H04L 2012/2849* (2013.01); *H04N 7/106* (2013.01)

(58) Field of Classification Search
CPC ............. H01R 24/547; H01R 12/2838; H01R 12/2861; H01R 7/104; H01R 7/106
See application file for complete search history.

(56) References Cited

U.S. PATENT DOCUMENTS

| | | | | |
|---|---|---|---|---|
| 5,355,096 | A | * | 10/1994 | Kobayashi ................... 330/278 |
| 2005/0289632 | A1 | * | 12/2005 | Brooks et al. ................ 725/126 |
| 2006/0010481 | A1 | | 1/2006 | Wall et al. |
| 2006/0225119 | A1 | | 10/2006 | Wollmershauser et al. |
| 2007/0256094 | A1 | * | 11/2007 | Pugel et al. .................... 725/34 |
| 2008/0018413 | A1 | * | 1/2008 | Strull et al. ................... 333/132 |

OTHER PUBLICATIONS

CTC Union Tech Co. Ltd., EOC20/21 User Manual, Sep. 2008, Ver. 0.9a, 22-26.*
"CTC Union Technologies Co., LTD", EOC-20/21 User Manual, Ver.0.9, Sections 1, 10.2, 10.3, 10.4, Sep. 2008.

* cited by examiner

*Primary Examiner* — Rong Le
(74) *Attorney, Agent, or Firm* — Guntin & Gust, PLC; Jay H. Anderson

(57) ABSTRACT

A device that incorporates teachings of the present disclosure may include, for example, a controller to provide low loss connectivity to a plurality of coaxial ports over a wide range of frequencies from D.C. to 2 GigaHertz in a coaxial network providing Ethernet networking, detune secondary coaxial splitters in the coaxial network that reduces an output-to-output isolation loss among secondary coaxial splitter output ports, and enable re-distribution of modulated radio frequency video signals from any point on the coaxial network to any alternative point on the coaxial network. Other embodiments are disclosed.

20 Claims, 6 Drawing Sheets

400

ETHERNET OVER COAXIAL COUPLING SYSTEM, METHOD AND APPARATUS

CROSS-REFERENCE TO RELATED APPLICATIONS

This application is a continuation of U.S. patent application Ser. No. 12/326,666 filed Dec. 2, 2008, which is incorporated herein by reference in its entirety.

FIELD OF THE DISCLOSURE

The present disclosure relates generally to coupling devices and more specifically to support an Ethernet-Over-Coax (EOC) technology coupling system, method, and device.

BACKGROUND

Coaxial splitters were implemented by cable companies as a means of providing analog cable signals to multiple television units within a home. However, due to imperfections in a cable plant or intermediate network elements, analog signals can "reflect" from one coaxial path hack onto an adjacent path causing "Ghost TV images." Because of the ghost image problem, splitter designs have evolved to incorporate a high signal isolation between their output ports to suppress the signal reflections (and ghost images).

The evolution of Internet Protocol (IP) networking technologies today makes it possible to deliver video (as well as voice and data) over these new networks, leveraging also the ability to map packet-based data onto a variety of Ethernet over Coax (EOC) network technologies (e.g., Home Phone-Line Network Assn., or HPNA; Multimedia over Coax Assn., or MoCA, or other similar competing solutions that permit the use of existing coax to deliver IP-network data throughout the home without rewiring). Unfortunately, use of the traditional Cable-TV splitter devices as part of EOC networks can severely impair achievable data rates between devices attached to the output ports because of the high design isolation of the legacy home network design that utilizes high isolation splitters.

DETAILED DESCRIPTION

One embodiment of the present disclosure can entail a method involving purposely creating a port impedance mismatch in a splitter for improved Ethernet networking over coaxial cables in a home coaxial network, detuning any secondary splitter coupled to the home coaxial network, and enable distribution of modulated radio frequency video over the home coaxial network to deliver analog video to a plurality of repeater devices coupled to the home coaxial network.

Another embodiment of the present disclosure can entail a computer-readable storage medium having computer instructions for creating a port impedance mismatch in a splitter for improved Ethernet networking over coaxial cables in a coaxial network, detuning any secondary splitter coupled to the coaxial network, and enable distribution of modulated radio frequency video over the coaxial network to deliver analog video to a plurality of repeater devices coupled to the coaxial network.

Yet another embodiment of the present disclosure can entail a device having a controller to provide low loss connectivity to a plurality of coaxial ports over a broadband range of frequencies in a coaxial network providing Ethernet networking, detune secondary coaxial splitters in the coaxial network that reduces an output-to-output isolation loss among secondary coaxial splitter output ports, and enable re-distribution of modulated radio frequency video signals from any point on the coaxial network to any alternative point on the coaxial network.

Yet another embodiment of the present disclosure can entail an Ethernet over coaxial network having a splitter providing low loss connectivity to a plurality of coaxial ports over a range of frequencies in a coaxial network by having a port impedance mismatch that causes a slightly lower power transfer to each leg of the splitter and a higher return loss figure where the splitter detunes secondary coaxial splitters in the coaxial network and reduces an output-to-output isolation loss among secondary coaxial splitter output ports.

Figure 1:
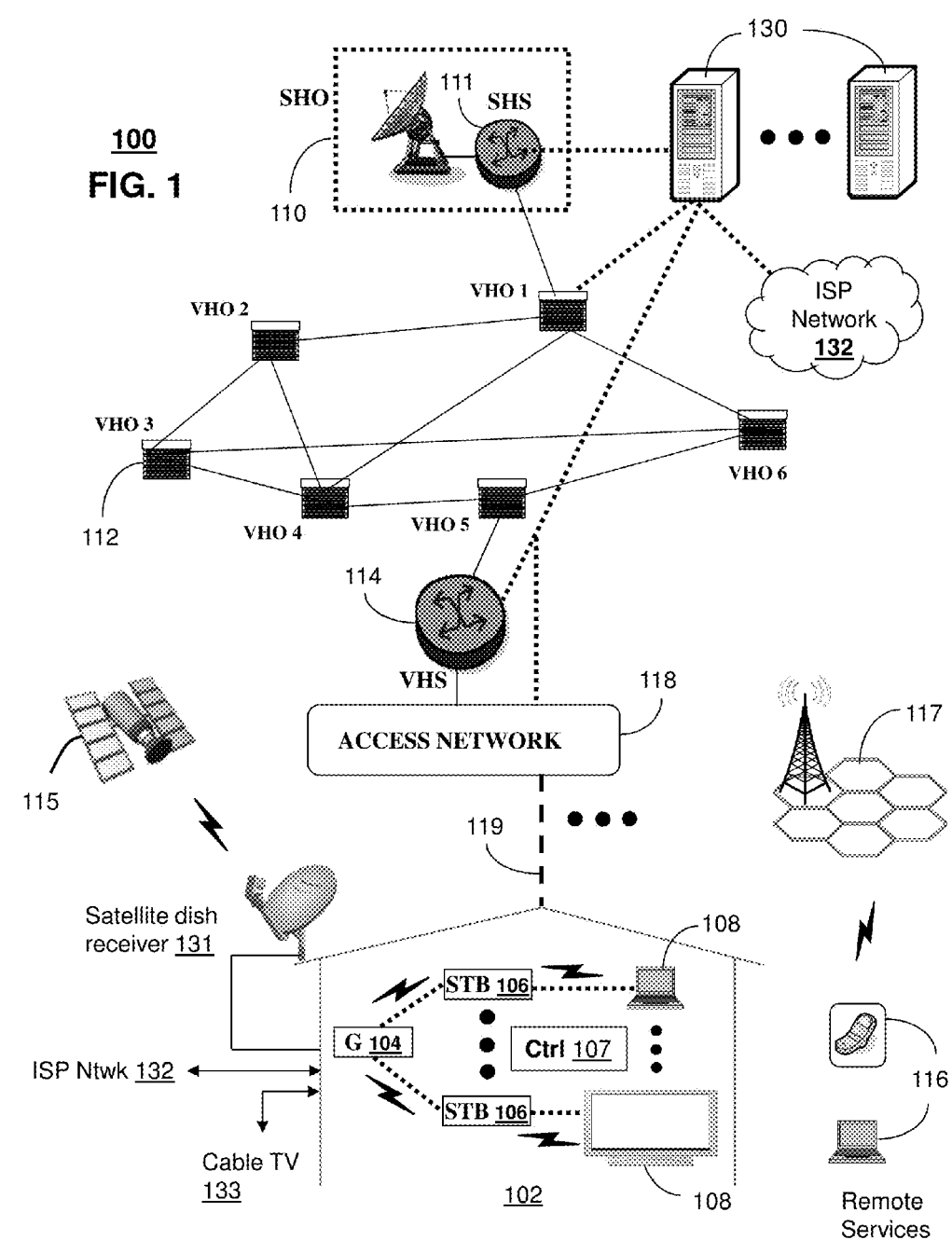
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute IP-based media signals to media processors 106 such as Set-Top Boxes (STBs) using an EOC technology which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast or multicast IP communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 directly or indirectly by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the digital media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services under conditions where the ECO technology and cable or satellite service frequency use does not overlap.

It follows from the above illustrations that the present disclosure can apply to any present or future interactive media content services.

Figure 2:
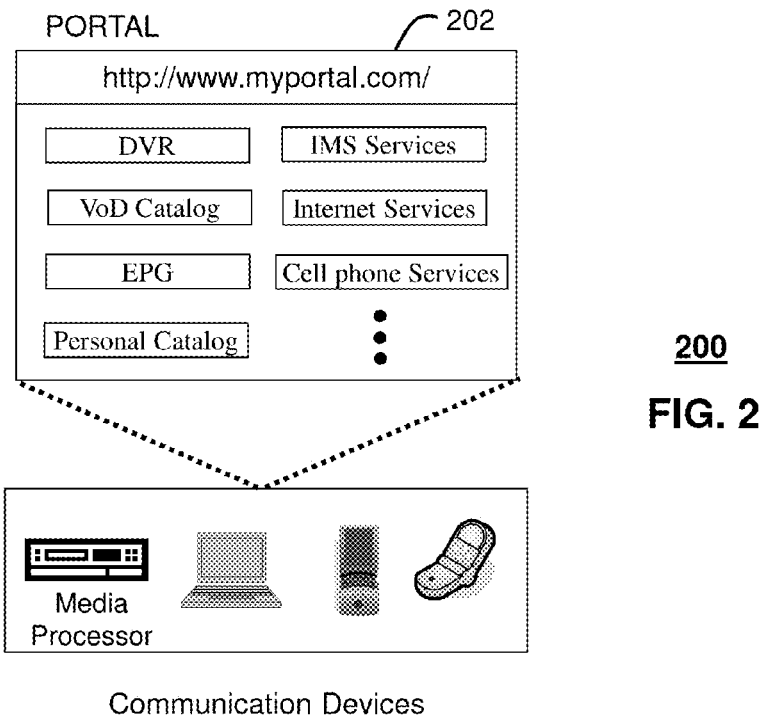
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
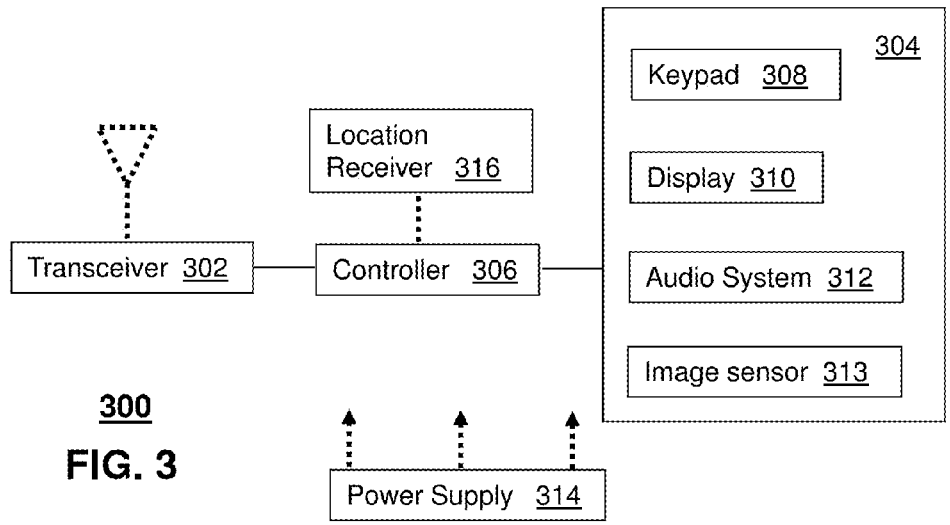
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/ EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation. The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication systems 100 of FIG. 1 such as a gaming console and a media player.

Figure 4:
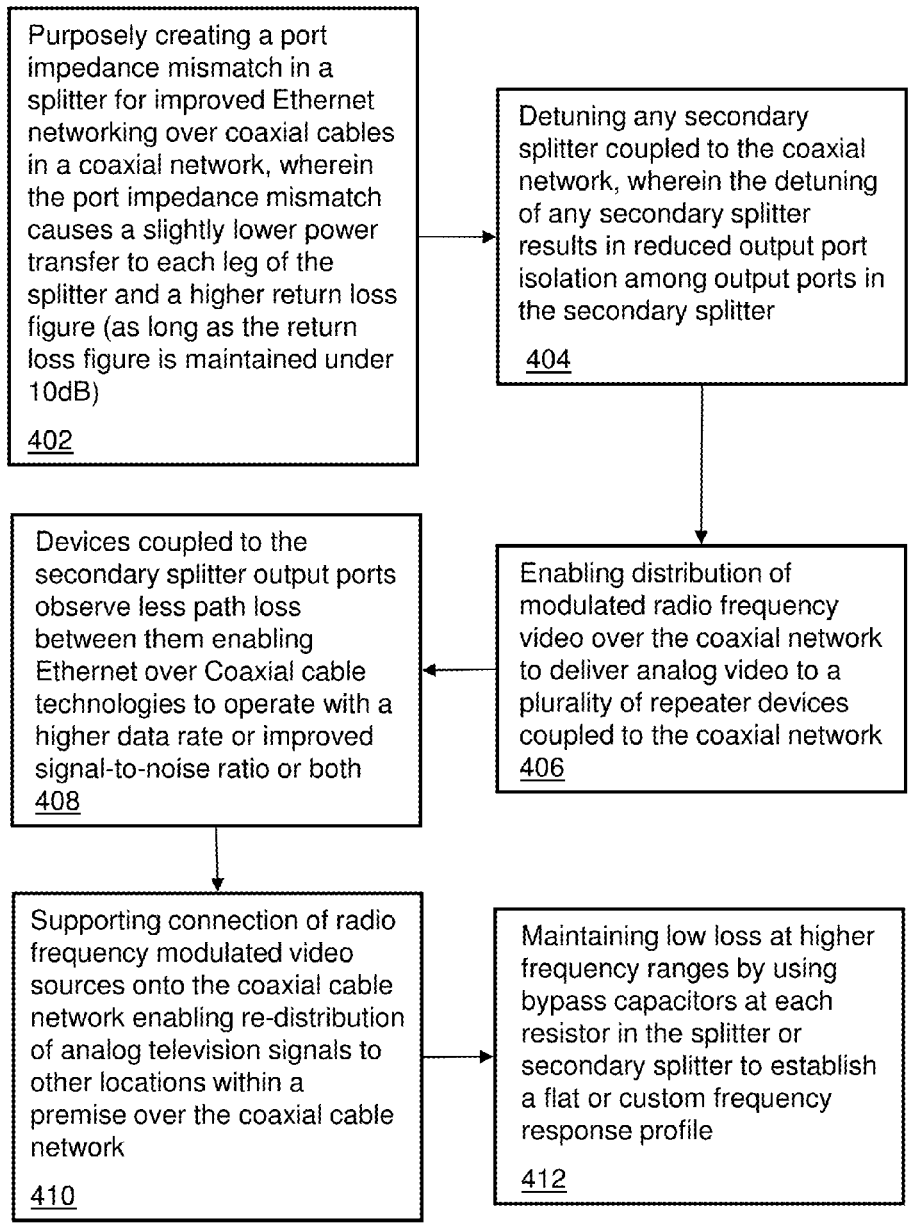
FIG. 4 depicts an illustrative embodiment of a method operating in portions of the communication system of FIG. 1.

FIG. 4 depicts an illustrative method 400 that operates in portions of the communication system of FIG. 1. Method 400 can begin with step 402 in which the method purposely creates a port impedance mismatch in a splitter for improved Ethernet networking over coaxial cables in a coaxial network such as a home coaxial network or a coaxial network in an office setting. The port impedance mismatch causes a slightly lower power transfer to each leg of the splitter and a higher return loss figure. The return loss figure generally should be under a 10 dB loss. The method 400 at 404 can detune any secondary splitter coupled to the coaxial network where the detuning of any secondary splitter results in a reduced output port isolation among output ports in the secondary splitter.

Note that the secondary splitters are assumed to be impedance matched to a coaxial cable at 75 Ohms for example and an input to the splitter can be an IPTV or iTV input signal. At 406, the method can enable distribution of modulated radio frequency (RF) video over the home coaxial network to deliver analog video to a plurality of repeater devices coupled to the home coaxial network.

Devices coupled to the secondary splitter output ports observe less path loss between them enabling Ethernet over Coaxial cable technologies to operate with a higher data rate or improved signal-to-noise ratio or both at 408. Note that the splitter can minimize splitter losses in all directions while enable operations over the coaxial cable at frequencies up to 1 Gigahertz or higher. At 410, the splitter can support connection of radio frequency modulated video sources onto the coaxial cable network enabling re-distribution of analog television signals to other locations within a home over the coaxial cable network. The method 400 maintains low loss at higher frequency ranges by using bypass capacitors at each resistor in the splitter or secondary splitter to establish a flat or custom frequency response profile at 412.

Upon reviewing the aforementioned embodiments, it would be evident to an artisan with ordinary skill in the art that said embodiments can be modified, reduced, or enhanced without departing from the scope and spirit of the claims described below. For example, the network is not limited to a home coaxial network, but can be configured for use in office or building scenarios and multi-dwelling units.

The embodiments herein further include a new coaxial splitter design that will serve not only to minimize the point-to-point loss that affects all existing EOC technologies, but also enables devices using these technologies to communicate in all directions with minimal loss, to detune any secondary splitter that may be hidden in the wall or attic or elsewhere, and also permit the distribution of modulated RF video on the coax network to deliver analog video to video repeater devices (2 or more secondary televisions) throughout the home, dwelling or building. This device performs all three of these functions simultaneously once installed at the "Main Home Splitter" location.

Figure 7:
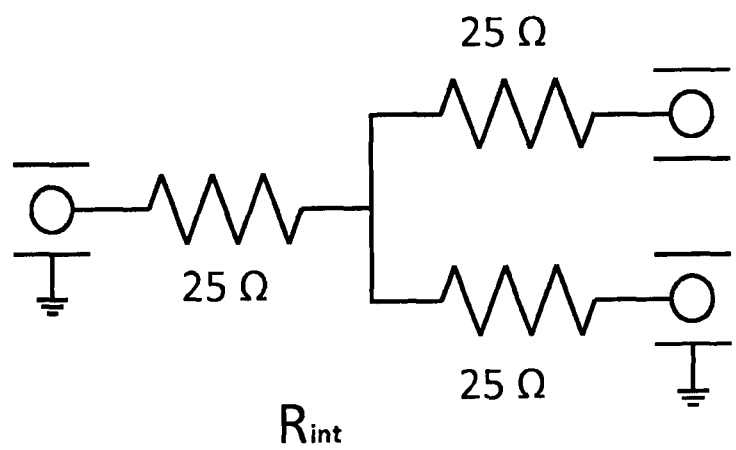
FIG. 7 is a schematic illustration of a purely resistive splitter.

An impedance-matching purely resistive splitter is typically designed based on the following formula:

$$R_{int} = \frac{Z(N-2)}{N}$$

where Z=Load Impedance (e.g., 75 ohms), and N=Total # of splitter ports A purely resistive splitter is shown schematically in FIG. 7. These equations and schematics may be expanded to accommodate many additional port configurations (e.g., 1:3, 1:4, 1:5, 1:6, etc.). Note however that the above example assumed all terminations are impedance matched to the coax (in this case RG-59 or RG-6 is at 75 ohms).

By purposely designing the splitter to represent a port impedance of either higher or lower than 75 ohms (predetermined impedance match), the net effect is a slightly less power transfer to each leg of the splitter, at the expense of somewhat higher than desired return loss figure. However, the port mismatch this creates propagates through the coax to an embedded splitter which results in a mismatch at its input port. As a result, the internal circuitry of a secondary conventional splitter is 'detuned' from its design optimum, resulting in reduced output port isolation in the output ports of the secondary splitter(s). Devices attached to the secondary splitter outputs thereby observe less path loss between them, making EOC technologies operate with higher rate or improved signal to noise ratios (or both). This effect works extremely well as long as return loss figures are not allowed to get completely out of hand (e.g., <10 dB).

The splitter device can be designed to minimize splitter losses in all directions, and also at frequencies up to approximately 1 GHz (or higher) in order to support connection of RF modulated video sources onto the coax plant in a way that permits re-distribution of the analog TV signal to other location is a premise (whether a home, office, or other structure). Maintaining low loss at higher frequency may be achieved using bypass capacitors at each resistor to establish a flat or custom frequency response profile. Current test units have demonstrated support for EOC and RF signals up to 1.5 GHz. Since most RF modulators provide output signal levels of +15 to +23 dBmV, and television receivers expect to have signal levels of at least −8 dBmV, the loss budget for the new splitter is between 23 and 31 dB for good quality video distribution. The splitter in accordance with the embodiments herein can exhibit even in a 1:6 configuration, losses in the 14 dB range in a worst case scenario. This relatively low loss easily permits RF distribution even in quite large homes or buildings.

Other suitable modifications can be applied to the present disclosure without departing from the scope of the claims below. Accordingly, the reader is directed to the claims section for a fuller understanding of the breadth and scope of the present disclosure.

Figure 5:
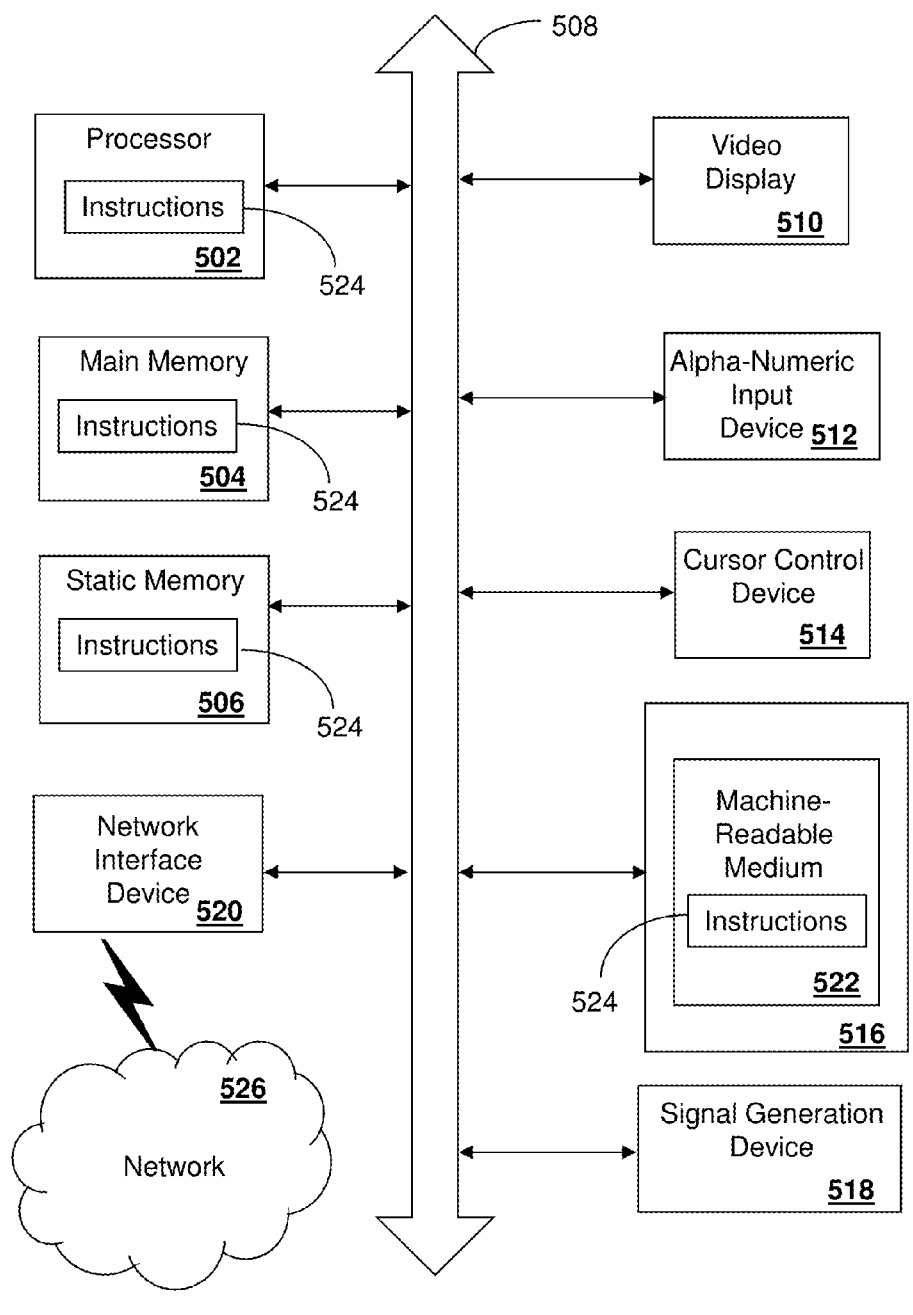
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Figure 6:
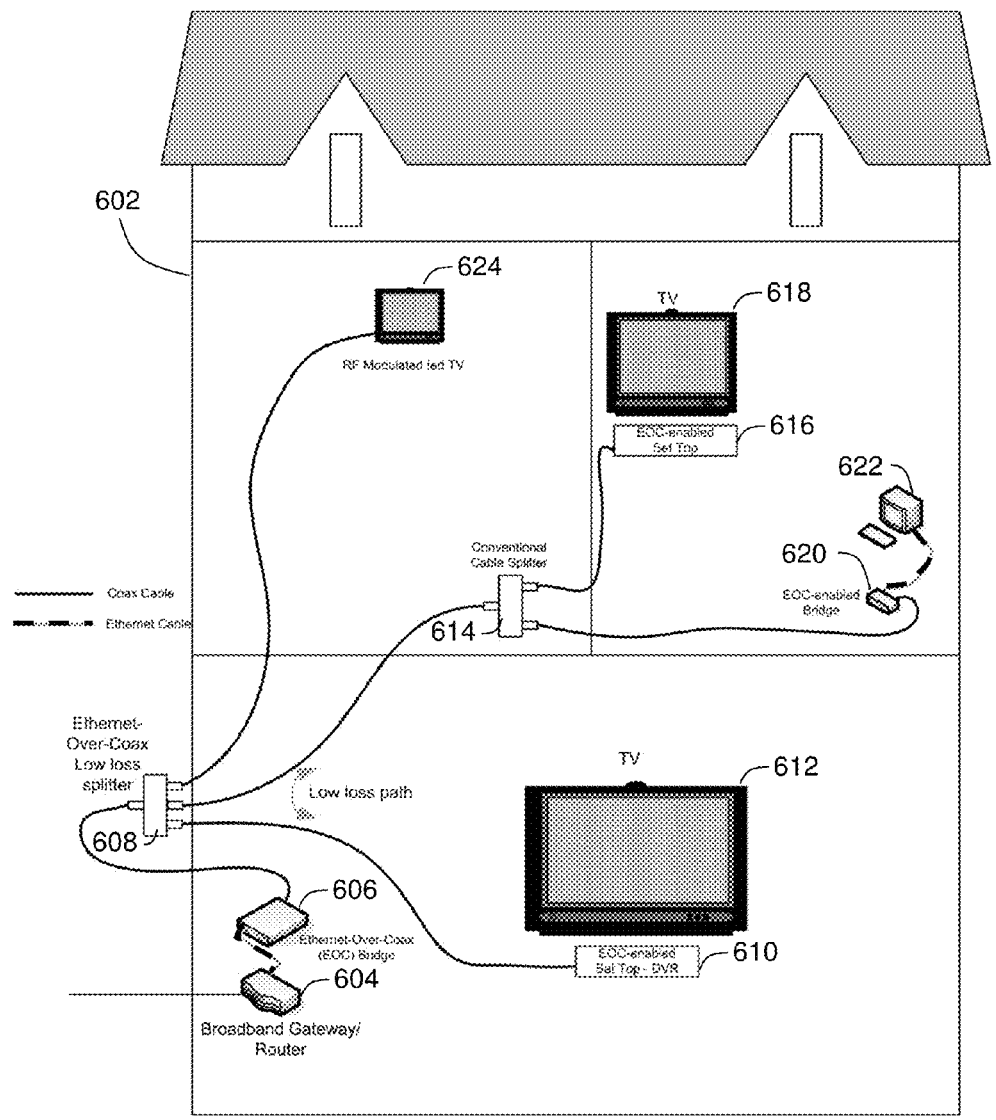
FIG. 6 is an illustration of a system using a splitter having a port impedance mismatch for Ethernet networking over coaxial cables in accordance with the embodiments herein.

FIG. 6 depicts an exemplary diagrammatic representation of a system 600 in a premise 602 such as a home or office where the new coaxial splitter design as contemplated herein in the form of splitter 608 can serve not only to minimize the point-to-point loss that affects all existing EOC technologies, but also enables devices using these technologies to communicate in all directions with minimal loss, to detune any secondary splitter such as secondary splitter 614 that may be hidden in the wall or attic or elsewhere, and also permit the distribution of modulated RF video on the coax network to deliver analog video to video repeater devices (2 or more secondary televisions such as TV 624) throughout the home, dwelling or building.

As illustrated, the system 600 can include a broadband gateway or router 604 coupled to an EOC bridge 606 over an Ethernet cable. The bridge 606 feeds a signal to the EOC low loss splitter 608 as contemplated in the embodiments herein. The splitter 608 can have low loss paths in multiple directions including a path to an EOC-enabled set top box (STB) or digital video recorder 610 that is coupled to TV 612 or a path to the secondary splitter 614. Since the secondary splitter 614 is detuned as discussed above, other EOC-enabled devices (such as EOC-enabled STB 616 and EOC-enabled Bridge 620 and their respective presentation devices 618 and 622) will operate without significant or perceptible detriment to the end user.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A splitter device, comprising:
a primary splitter and a secondary splitter,
wherein the primary splitter comprises:
an input port coupled to an Ethernet over coaxial cable bridge;
an output port having an output impedance mismatch with an input impedance of an input port of the secondary splitter to cause an increased return loss and a reduced output port isolation in the primary splitter; and
a plurality of capacitors each bypassing each resistor of a plurality of resistors of the primary splitter,
wherein the impedance mismatch causes a lower power transfer from the input port of the primary splitter to the output port of the primary splitter and a higher return loss figure relative to the input impedance of the secondary splitter, and
wherein the impedance mismatch causes a detuning of the splitter device to reduce an output-to-output isolation loss among a first output port and a second output port of the secondary splitter when coupled in an Ethernet over Coaxial network.

2. The splitter device of claim 1, wherein devices coupled to the first output port of the secondary splitter and the second output port of the secondary splitter observe less path loss between them enabling Ethernet over Coaxial cable technologies to operate with a higher data rate, an improved signal-to-noise ratio, or both.

3. The splitter device of claim 1, wherein in accordance with the plurality of capacitors each bypassing each resistor of the plurality of resistors of the primary splitter, the splitter device maintains low loss at higher frequency ranges to establish a flat frequency response profile, a custom frequency response profile, or a combination thereof.

4. The splitter device of claim 1, wherein the return loss figure is less than 10 dB.

5. The splitter device of claim 1, wherein the secondary splitter is coupled to the primary splitter via the input port of the secondary splitter by a coaxial cable in a home coaxial network.

6. The splitter device of claim 5, wherein the secondary splitter is coupled to devices via the first output port of the secondary splitter and the second output port of the secondary splitter by coaxial cables to distribute Ethernet signals from the primary splitter to the devices over the home coaxial network.

7. The splitter device of claim 5, wherein the secondary splitter is impedance matched to a coaxial cable at 75 Ohms.

8. The splitter device of claim 1, wherein the primary splitter is coupled to a video repeater device via a second output port of the primary splitter by a coaxial cable to deliver analog video signals to the video repeater device.

9. A device comprising:
an Ethernet over coaxial cable bridge comprising a bridge input for coupling to a gateway device by an Ethernet cable; and
a primary splitter comprising:
an input port coupled to the bridge;
an output port having an output impedance mismatch with an input impedance of an input port of a secondary splitter to cause an increased return loss and a reduced output port isolation; and
a plurality of capacitors each bypassing each resistor of a plurality of resistors of the primary splitter, wherein the impedance mismatch causes a lower power transfer from the input port of the primary splitter to the output port of the primary splitter and a higher return loss figure relative to the input impedance of the secondary splitter, wherein the impedance mismatch with the secondary splitter causes a detuning of the secondary splitter to reduce an output-to-output isolation loss among a first output port and a second output port of the secondary splitter when coupled in an Ethernet over coaxial network.

10. The device of claim 9, wherein the primary splitter enables re-distribution of modulated radio frequency video signals from any point on the coaxial network to any alternative point on the coaxial network.

11. The device of claim 9, wherein devices coupled to the first output port and the second output port of the secondary splitter observe less path loss between them enabling Ethernet over Coaxial cable technologies to operate with a higher data rate, an improved signal-to-noise ratio, or both.

12. The device of claim 9, wherein the primary splitter supports transmission of radio frequency modulated video sources onto the coaxial network enabling re-distribution of analog television signals to other locations within a home over the coaxial network.

13. The device of claim 9, wherein in accordance with the plurality of capacitors each bypassing each resistor of the plurality of resistors of the primary splitter, the primary splitter maintains low loss at higher frequency ranges to establish a flat frequency response profile, a custom frequency response profile, or a combination thereof.

14. The device of claim 9, wherein the return loss figure is less than 10 dB.

15. A device comprising:
a gateway having an output;
an Ethernet over coaxial cable bridge comprising a bridge input for coupling to the output of the gateway by an Ethernet cable; and
a primary splitter comprising:
an input port coupled to the bridge;
an output port having an output impedance mismatch with an input impedance of an input port of a secondary splitter to cause an increased return loss and a reduced output port isolation; and
a plurality of capacitors each bypassing each resistor of a plurality of resistors of the primary splitter, wherein the mismatch causes a lower power transfer from the input port of the primary splitter to the output port of the primary splitter and a higher return loss figure relative to the input impedance of the secondary splitter, wherein the impedance mismatch with the secondary splitter causes a detuning of the secondary splitter to reduce an output-to-output isolation loss among a first output port and a second output port of the secondary splitter when coupled in an Ethernet over coaxial network.

16. The device of claim 15, wherein the primary splitter enables re-distribution of modulated radio frequency video signals from any point on the coaxial network to any alternative point on the coaxial network.

17. The device of claim 15, wherein devices coupled to the first output port and the second output port of the secondary splitter observe less path loss between them enabling Ethernet over Coaxial cable technologies to operate with a higher data rate, an improved signal-to-noise ratio, or both.

18. The device of claim 15, wherein the primary splitter supports transmission of radio frequency modulated video sources onto the coaxial network enabling re-distribution of analog television signals to other locations within a home over the coaxial network.

19. The device of claim 15, wherein in accordance with the plurality of capacitors each bypassing each resistor of the plurality of resistors of the primary splitter, the primary splitter maintains low loss at higher frequency ranges to establish a flat frequency response profile, a custom frequency response profile, or a combination thereof.

20. The device of claim 15, wherein the return loss figure is less than 10 dB.

* * * * *